US012570360B2

(12) United States Patent
Hyodo et al.

(10) Patent No.: US 12,570,360 B2
(45) Date of Patent: Mar. 10, 2026

(54) VEHICLE ROOF STRUCTURE

(71) Applicant: TOYOTA JIDOSHA KABUSHIKI KAISHA, Aichi-ken (JP)

(72) Inventors: Hiroki Hyodo, Toyota (JP); Masaya Miura, Toyota (JP); Koichiro Ueno, Nagoya (JP); Shintaro Kitakata, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 30 days.

(21) Appl. No.: 18/583,766

(22) Filed: Feb. 21, 2024

(65) Prior Publication Data

US 2024/0326922 A1     Oct. 3, 2024

(30) Foreign Application Priority Data

Mar. 31, 2023    (JP) ................................. 2023-059309

(51) Int. Cl.
H01Q 1/36 (2006.01)
B62D 25/06 (2006.01)
H01Q 1/32 (2006.01)

(52) U.S. Cl.
CPC ........... B62D 25/06 (2013.01); H01Q 1/3275 (2013.01)

(58) Field of Classification Search
CPC .. H01Q 1/36; H01Q 1/40; H01Q 1/42; H01Q 1/288; H01Q 1/3275; H01Q 1/3283; H01Q 1/3291; B62D 25/06; B62D 29/04
See application file for complete search history.

(56) References Cited

U.S. PATENT DOCUMENTS

| | | | | |
|---|---|---|---|---|
| 8,894,136 | B2 * | 11/2014 | Shono .................... | B62D 25/06 |
| | | | | 296/210 |
| 10,476,144 | B2 * | 11/2019 | Mizutani .................. | H01Q 1/32 |
| 2007/0171137 | A1 * | 7/2007 | Mierzwa ............... | H01Q 1/288 |
| | | | | 343/700 MS |
| 2018/0050633 | A1 | 2/2018 | Terai et al. | |
| 2018/0277922 | A1 * | 9/2018 | Kim ..................... | H01Q 1/1214 |
| 2020/0058988 | A1 * | 2/2020 | Elshaar ............... | H01Q 1/3275 |
| 2021/0013601 | A1 * | 1/2021 | Takemoto .......... | C08G 18/3814 |
| 2022/0242335 | A1 * | 8/2022 | Nakagawa ........... | H01Q 1/1221 |
| 2023/0163451 | A1 * | 5/2023 | Koike .................. | H01Q 1/3275 |
| | | | | 343/713 |
| 2023/0170607 | A1 | 6/2023 | Kurokawa et al. | |

FOREIGN PATENT DOCUMENTS

| | | | |
|---|---|---|---|
| JP | 2003-309409 A | 10/2003 | |
| JP | 2003-309410 A | 10/2003 | |
| JP | 2016165989 A | 9/2016 | |
| JP | 2023-079896 A | 6/2023 | |

* cited by examiner

*Primary Examiner* — Tung X Le

(74) *Attorney, Agent, or Firm* — HAUPTMAN HAM, LLP

(57) ABSTRACT

A vehicle roof structure, that includes: a rear header reinforcement that configures a part of a roof of a vehicle body, that is provided with a closed cross section extending in a vehicle width direction and having a closed cross sectional shape as viewed in the vehicle width direction, and that is configured to support an antenna, configured for at least one of transmission or reception of radio waves, directly or via a member in a state in which a vehicle upper side above the antenna is opened; and a roof panel that configures a main part of an upper surface of the roof, that covers the antenna from the vehicle upper side, and that is configured by a radio wave-transmissible material.

10 Claims, 6 Drawing Sheets

VEHICLE ROOF STRUCTURE

CROSS-REFERENCE TO RELATED APPLICATION

This application is based on and claims priority under 35 USC 119 from Japanese Patent Application No. 2023-059309 filed on Mar. 31, 2023, the disclosure of which is incorporated by reference herein.

BACKGROUND

Technical Field

The present disclosure relates to a vehicle roof structure.

Related Art

Japanese Patent Application (JP-A) No. 2003-309409 discloses a mounting structure of a vehicle embedded antenna. In the mounting structure of the vehicle embedded antenna, a concave portion is formed in a roof portion or the like of a vehicle body, the antenna (communication device) is housed in the concave portion, and an upper side of the concave portion is covered with a cover configured by a non-metal.

However, it is conceivable that simply forming the concave portion in the roof portion of the vehicle body as in the above-noted related art will result in insufficient rigidity of the vehicle body with respect to rollover or the like of the vehicle. Further, in the above-mentioned related art, it is conceivable that a boundary line will be produced between a roof panel made of metal and a cover positioned above the antenna, and the appearance of the vehicle will be impaired. Namely, in the above-mentioned related art, there is room for improvement from the perspective of securing the design properties of the vehicle appearance, while lessening the likelihood of a communication device installed in the vehicle body from being affected by a load input to the vehicle body during rollover or the like.

SUMMARY

An aspect of the present disclosure is a vehicle roof structure, that includes: a rear header reinforcement that configures a part of a roof of a vehicle body, that is provided with a closed cross section extending in a vehicle width direction and having a closed cross sectional shape as viewed in the vehicle width direction, and that is configured to support an antenna, configured for at least one of transmission or reception of radio waves, directly or via a member in a state in which a vehicle upper side above the antenna is opened; and a roof panel that configures a main part of an upper surface of the roof, that covers the antenna from the vehicle upper side, and that is configured by a radio wave-transmissible material.

DETAILED DESCRIPTION

First Exemplary Embodiment

Figure 1:
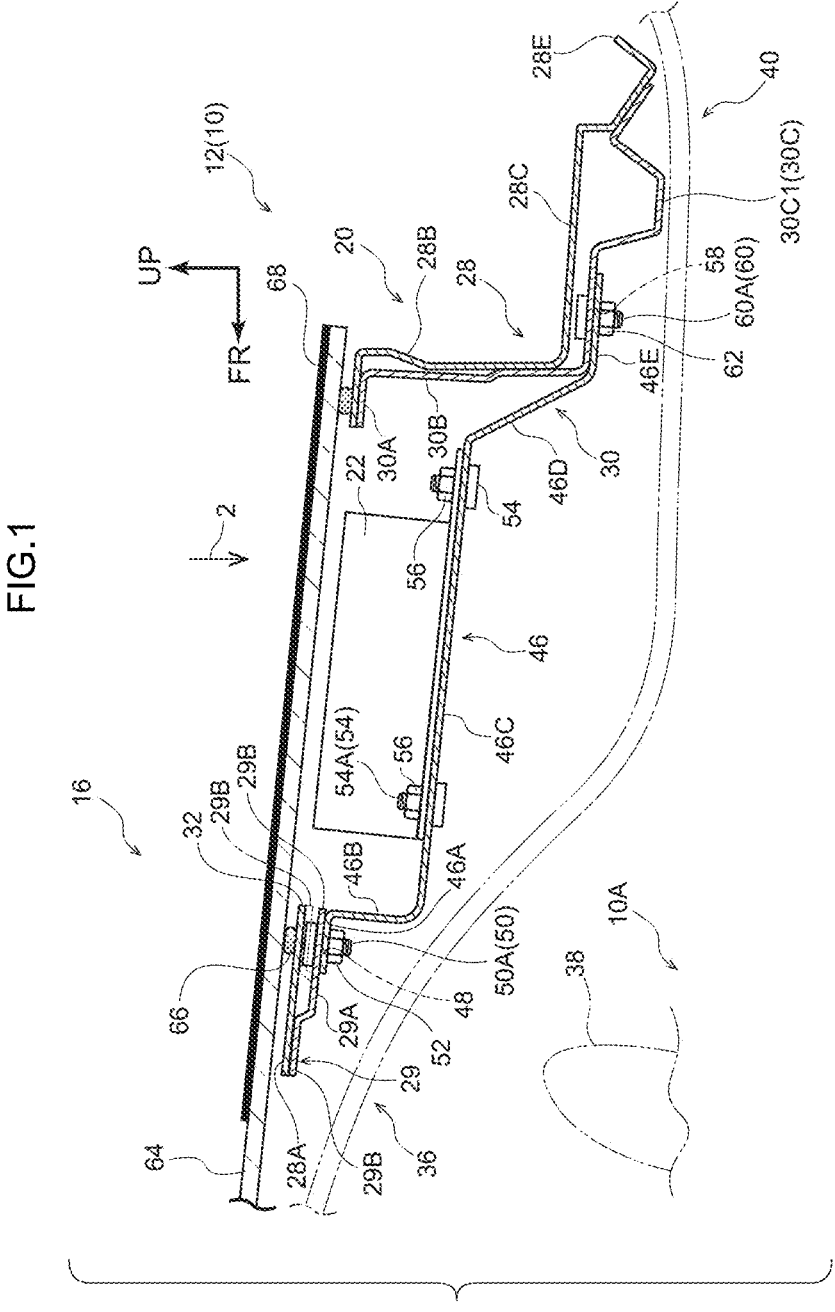
FIG. 1 is a cross sectional view (a cross section showing a state sectioned along line 1-1 in FIG. 3) schematically illustrating a configuration of a relevant portion of a vehicle body to which a vehicle roof structure according to a first exemplary embodiment is applied.
Figure 2:
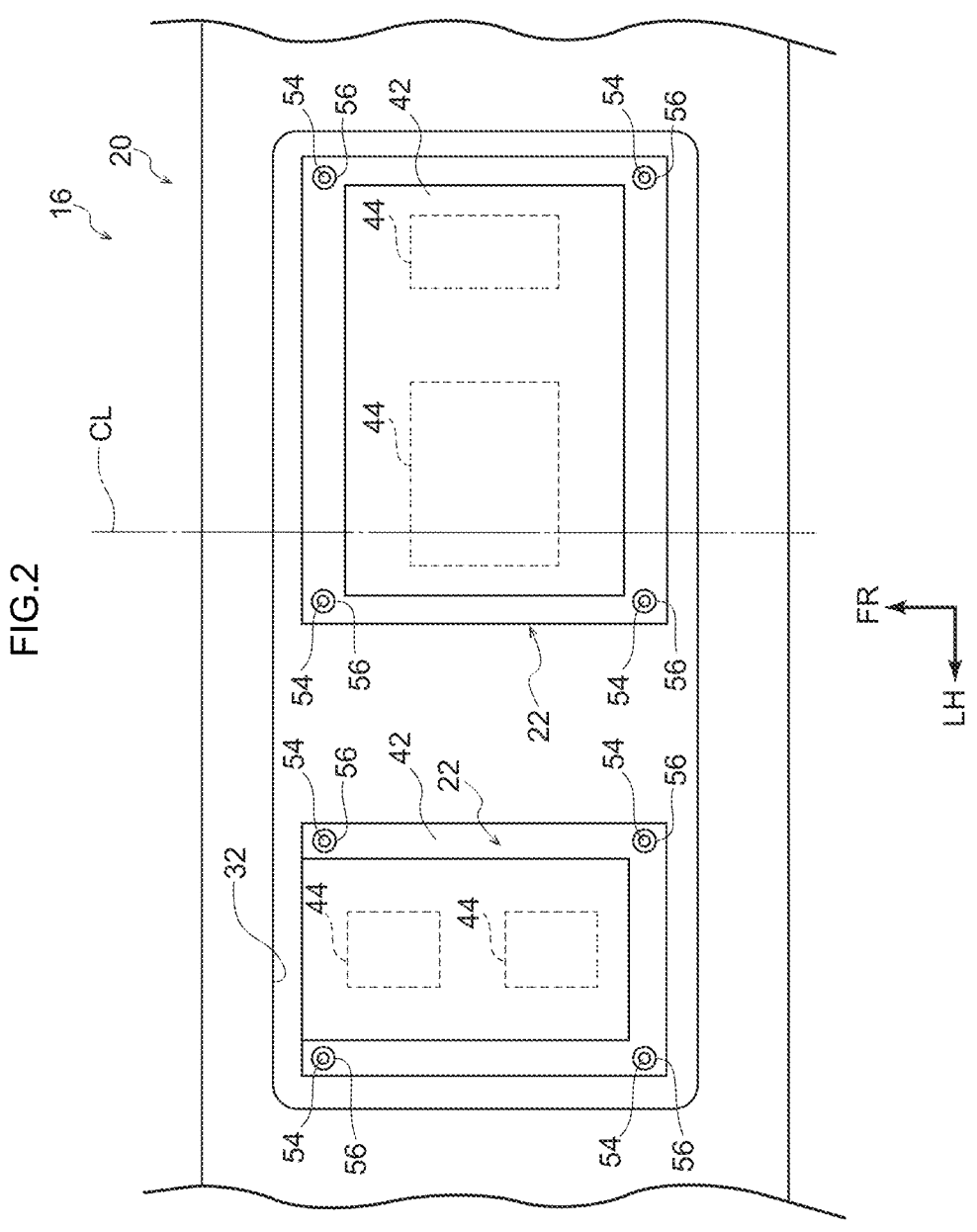
FIG. 2 is a plan view (a view in the direction of arrow 2 in FIG. 1) schematically illustrating a configuration of a relevant portion of a vehicle body to which a vehicle roof structure according to a first exemplary embodiment is applied.
Figure 3:
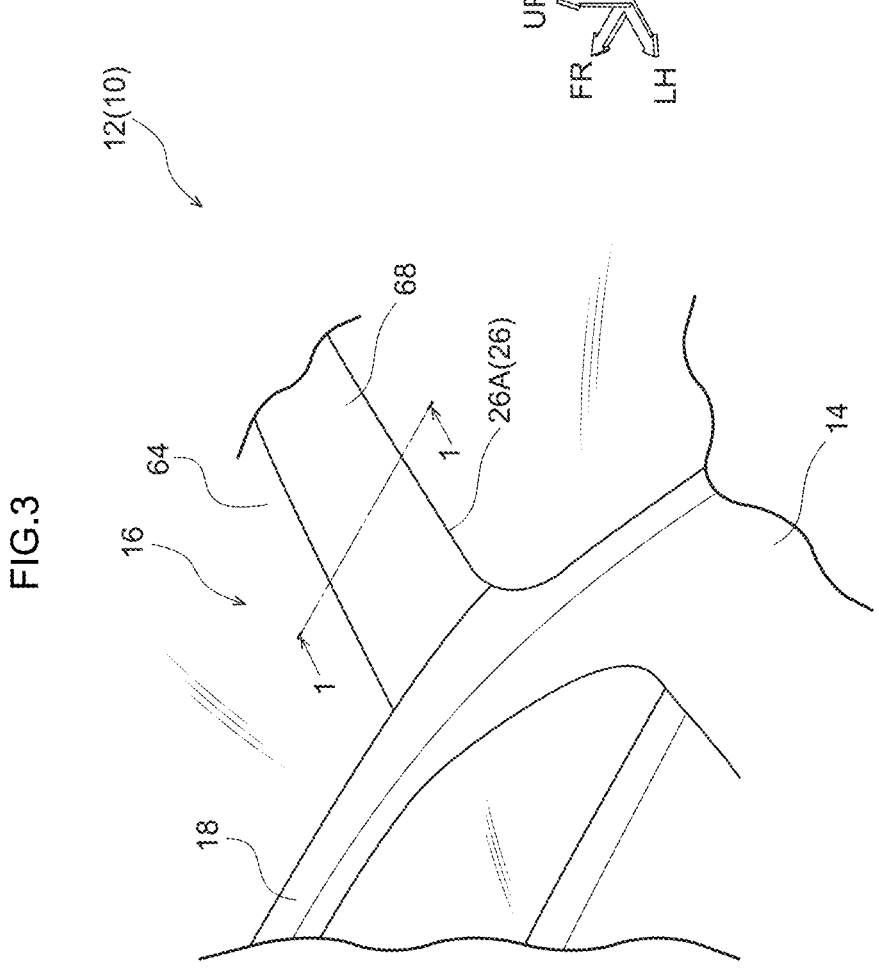
FIG. 3 is a perspective view schematically illustrating a configuration of a vehicle body to which a vehicle roof structure according to a first exemplary embodiment is applied, viewed from a vehicle left rear side.

Explanation follows regarding a first exemplary embodiment of a vehicle roof structure according to the present disclosure, with reference to FIGS. 1 to 3. Note that in each of the drawings, the arrow FR shown as appropriate indicates the vehicle front side of a "vehicle 10" to which the vehicle roof structure according to the present exemplary embodiment is applied, the arrow UP indicates the vehicle upper side of the vehicle 10, and the arrow LH indicates the vehicle width direction left side of the vehicle 10.

Explanation follows first regarding a schematic configuration of a "vehicle body 12" configuring a main portion of a vehicle interior 10A of a vehicle 10, with reference to FIG. 3. The vehicle body 12 includes a left and right pair of front pillars, a left and right pair of center pillars, and a left and right pair of rear pillars 14 at the vehicle width direction outer sides. Respective upper end portions of the front pillar, the center pillar, and the rear pillar 14 are coupled to each other by a roof side rail 18 configuring a portion of the "roof portion 16" of the vehicle body 12. Note that the vehicle body 12 is basically configured symmetrically with respect to a center line CL (see FIG. 2) extending in the vehicle front-rear direction.

The roof side rail 18 extends in the vehicle front-rear direction, and is configured including an outer panel configuring a portion at the vehicle width direction outer side, and an inner panel configuring a portion at the vehicle width direction inner side. The roof side rail 18 has a closed cross section structure in which a cross section viewed from the vehicle front-rear direction is a closed cross section, owing to the outer panel and the inner panel being joined together at a joint portion by spot welding or the like.

In the present exemplary embodiment, as illustrated in FIGS. 1 and 2, a characteristic feature is that an "antenna unit 22", as a communication device, is supported by a "rear header reinforcement 20", as a reinforcing portion that connects together portions at the vehicle rear side of the pair of roof side rails 18 in the vehicle width direction. Detailed explanation follows regarding the configuration of the rear header reinforcement 20 and its surroundings.

The rear header reinforcement 20 extends along an upper edge portion 26A (see FIG. 3) of a back door opening portion 26 in the vehicle width direction. The rear header reinforcement 20 is configured including an upper panel 28 configuring an upper vehicle side portion thereof, a front lower panel 29 configuring a vehicle front side portion of a vehicle lower side portion thereof, and a rear lower panel 30 configuring a vehicle rear side portion of a vehicle lower side thereof. Note that the upper panel 28 and the rear lower panel 30 are formed by pressing a steel plate.

The upper panel 28 is configured including a first upper wall portion 28A, a first upper vertical wall portion 28B, a second upper wall portion 28C, a second upper vertical wall portion 28D, and an upper extending wall portion 28E.

The first upper wall portion 28A configures a main portion of the upper panel 28, and extends in the vehicle width direction and the vehicle front-rear direction with its plate thickness direction in the vehicle vertical direction. One or more penetration portions (tunnels) 32 are provided in the first upper wall portion 28A, and the antenna unit 22 is housed inside the penetration portion 32 as viewed from the vehicle vertical direction.

The first upper vertical wall portion 28B extends from a peripheral edge portion at the vehicle rear side of the first upper wall portion 28A toward the vehicle lower side, with its plate thickness direction in the vehicle front-rear direction, and the second upper wall portion 28C extends from a peripheral edge portion at the vehicle lower side of the first upper vertical wall portion 28B toward the vehicle rear side, with its plate thickness direction in the vehicle vertical direction.

Further, the second upper vertical wall portion 28D extends from a peripheral edge portion at the vehicle rear side of the second upper wall portion 28C toward the vehicle lower side, with its plate thickness direction in the vehicle front-rear direction, and the upper extending wall portion 28E extends toward the vehicle rear lower side from a peripheral edge portion at the vehicle lower side of the second upper vertical wall portion 28D. Note that a vehicle rear side portion of the upper extending wall portion 28E extends toward the vehicle upper side, and a weather strip is attached to this portion.

The front lower panel 29 is disposed at a vehicle lower side of a vehicle front side portion of the penetration portion 32 in the first upper wall portion 28A, and is configured including a bulge portion 29A and a pair of joint piece portions 29B. Specifically, the bulge portion 29A is formed in the shape of an isosceles trapezoid that is open at the vehicle upper side as viewed in the vehicle width direction, and that narrows in width on progression from the vehicle upper side toward the vehicle lower side. The joint piece portions 29B respectively extend toward the vehicle front side from a peripheral edge portion at the vehicle front side of the bulge portion 29A, and toward the vehicle rear side from a peripheral edge portion at the vehicle rear side of the bulge portion 29A. The joint piece portion 29B is joined to a vehicle front side portion of the penetration portion 32 in the first upper wall portion 28A by a joint portion by spot welding or the like.

Namely, in the present exemplary embodiment, a "closed cross section structure portion 36" serving as a second reinforcing portion that extends in the vehicle width direction and has a closed cross section shape when viewed from the vehicle width direction is configured at a vehicle front side portion of the rear header reinforcement 20. Note that a rear seat 38 is disposed at the vehicle lower side of the closed cross section structure portion 36.

The rear lower panel 30 is configured including a first lower wall portion 30A, a first lower vertical wall portion 30B, and a second lower wall portion 30C.

The first lower wall portion 30A is disposed so as to overlap with a vehicle lower side of a vehicle rear side portion of the penetration portion 32 in the first upper wall portion 28A, and extends in the vehicle width direction with a plate thickness direction in the vehicle vertical direction. Namely, in the present exemplary embodiment, the vehicle upper side of the rear header reinforcement 20 above the antenna unit 22 is in an open state.

The first lower vertical wall portion 30B extends from a peripheral edge portion at the vehicle rear side of the first lower wall portion 30A toward the vehicle lower side, with its plate thickness direction in the vehicle front-rear direction, and is joined to the first upper vertical wall portion 28B by a joint portion by spot welding or the like at a vehicle lower side portion thereof. The second lower wall portion 30C extends from a peripheral edge portion at a vehicle lower side of the first lower vertical wall portion 30B toward a vehicle rear side, with its plate thickness direction in the vehicle vertical direction. Note that the second lower wall portion 30C is disposed at a predetermined spacing from the second upper wall portion 28C in the vehicle vertical direction.

At a vehicle front-rear direction central portion of the second lower wall portion 30C, an isosceles trapezoidal bulge portion 30C1 is provided that is convex toward a vehicle lower side when viewed from the vehicle width direction, and that narrows in width on progression from a vehicle upper side toward a vehicle lower side. The second lower wall portion 30C is extended toward the vehicle rear lower side of the bulge portion 30C1, and is joined to the upper extending wall portion 28E by a joint portion by spot welding or the like.

Namely, in the present exemplary embodiment, a "closed cross section structure portion 40" serving as a first reinforcing portion that extends in the vehicle width direction and has a closed cross section shape when viewed from the vehicle width direction is configured at a vehicle rear side portion of the rear header reinforcement 20.

As illustrated in FIG. 2, the antenna unit 22 includes a case 42, which is made of a material such as a resin that is capable of transmitting radio waves, and configures an outer shell thereof, and plural antennas 44 that are capable of transmitting and/or receiving radio waves and that are stored in the case 42.

Note that examples of the type of antenna 44 include a DCM (Data Communication Module) antenna, a GPS (Global Positioning System) antenna, a wireless LAN (Local Area Network) antenna, and an ETC (Electronic Toll Collection) antenna. As illustrated in FIG. 1, the antenna 44 is supported by the rear header reinforcement 20 via a "support plate 46" serving as a communication device support portion.

The support plate 46 is formed by pressing a steel plate, and is formed in a rectangular shape with its length direction as the vehicle width direction when viewed from the vehicle vertical direction. The support plate 46 is configured including a front side support piece portion 46A, a front wall portion 46B, a main wall portion 46C, an inclined wall portion 46D, and a rear side support piece portion 46E.

The front side support piece portion 46A has a plate thickness direction in the vehicle vertical direction, is positioned at the vehicle lower side of the joint piece portion 29B at the vehicle rear side of the front lower panel 29, and a penetration portion 48 is formed at plural locations in a row in the vehicle width direction.

Further, the joint piece portion 29B at the vehicle rear side of the front lower panel 29 is recessed toward the vehicle lower side at plural locations in a row in the vehicle width direction, and these locations are in a state in which they are in contact with portions of the front support piece portion 46A in which the penetration portions 48 are formed. A weld bolt 50 is attached to the above-mentioned locations of the joint piece portion 29B at the vehicle rear side in a state in which its shaft portion 50A projects toward the vehicle lower side.

When a nut 52 is fastened to the shaft portion 50A from the vehicle lower side in a state in which the shaft portion 50A is inserted into the penetration portion 48, a vehicle front side portion of the support plate 46 assumes a state of being fixed to the closed cross section structure portion 36.

The front wall portion 46B is extended from a peripheral wall portion at the vehicle rear side of the front side support piece portion 46A toward the vehicle lower side with a plate thickness direction serving in the vehicle front-rear direction, and is positioned at the vehicle front side of the antenna unit 22. The main wall portion 46C extends from a peripheral edge portion at a vehicle lower side of the front wall portion 46B toward the vehicle rear side, with its plate thickness direction in the vehicle vertical direction.

Weld bolts 54 are attached to plural locations of the main wall portion 46C, with their shaft portions 54A projecting toward the vehicle upper side. The antenna unit 22 is attached to the support plate 46 by fastening a nut 56 to the shaft portion 54A from the vehicle upper side in a state in which the shaft portion 54A is inserted into a penetration portion provided in the case 42 of the antenna unit 22.

The inclined wall portion 46D extends toward the vehicle rear lower side from a peripheral edge portion at the vehicle rear side of the main wall portion 46C. The rear side support piece portion 46E extends toward the vehicle rear side from a peripheral edge portion at the vehicle lower side of the inclined wall portion 46D, with its plate thickness direction in the vehicle vertical direction. Penetration portions 58 are formed at plural locations in a row in the vehicle width direction in the rear side support piece portion 46E.

Further, a weld bolt 60 is attached at plural locations in a row in the vehicle width direction, in a state in which a shaft portion 60A of the weld bolt 60 projects toward the vehicle lower side, at a vehicle front side portion of the bulge portion 30C1 in the second lower wall portion 30C of the rear lower panel 30.

Further, when a nut 62 is fastened to the shaft portion 60A from the vehicle lower side in a state in which the shaft portion 60A is inserted into the penetration portion 58, a vehicle rear side portion of the support plate 46 assumes a state of being fixed to the closed cross section structure portion 40.

A "roof panel 64" configuring a main portion of the roof portion 16 is disposed at the vehicle upper side of the rear header reinforcement 20. The roof panel 64 is made of a transparent material capable of transmitting radio waves, such as polycarbonate or glass, and is formed in a plate shape extending in the vehicle front-rear direction and the vehicle width direction as viewed in the vehicle vertical direction, and covers the vehicle interior 10A, the rear header reinforcement 20, and the antenna unit 22 from the vehicle upper side. The roof panel 64 is joined to the upper panel 28 by a joint portion 66 made of an adhesive or the like, provided so as to surround the penetration portion 32 as viewed in the vehicle vertical direction.

Further, a "coating film portion 68", serving as a decorative portion, is provided at a portion of the roof panel 64 that overlaps with the rear header reinforcement 20 and the antenna unit 22, as seen from the vehicle upper side, by being painted with ceramic paint or the like. Namely, when the roof panel 64 is viewed from the vehicle upper side, the rear header reinforcement 20 and the antenna unit 22 are in a hidden state at the coating film portion 68.

Mechanism and Effect of the Present Exemplary Embodiment

Explanation follows regarding the mechanism and advantageous effects of the present exemplary embodiment.

As illustrated in FIG. 1, in the present exemplary embodiment, a portion of the roof portion 16 of the vehicle body 12 is configured by the rear header reinforcement 20, and the rear header reinforcement 20 includes a closed cross section structure portion 36 and a closed cross section structure portion 40 that extend in the vehicle width direction, and that are shaped in a closed cross section shape as viewed in the vehicle width direction. As a result, in the present exemplary embodiment, the rear header reinforcement 20 can reinforce the roof portion 16 with respect to a load caused by rollover or the like. The rear header reinforcement 20 supports the antenna unit 22, which is capable of transmitting and/or receiving radio waves, directly or via a member.

Here, from the perspective of reinforcing the roof portion 16, it is preferable that the constituent elements of the roof portion 16, such as the rear header reinforcement 20, be made of metal or the like; however, metal cannot transmit radio waves transmitted and received by the antenna unit 22. In this regard, it would be conceivable to configure only the vehicle upper side portion of the antenna unit 22 of the roof panel 64 with a material that is capable of transmitting radio waves, such as resin, and to configure other portions of the roof panel 64 with a steel material or the like. However, in such a configuration, it is conceivable that a boundary line will be produced between a portion of the roof panel 64 at the vehicle upper side of the antenna unit 22 and other portions, thereby impairing the appearance of the vehicle 10.

Note that in the present exemplary embodiment, the rear header reinforcement 20 supports the antenna unit 22 in a state in which the vehicle upper side of the antenna unit 22 is open. A roof panel 64 configuring a main portion of the upper face of the roof portion 16 is configured of a material capable of transmitting radio waves, and covers the antenna unit 22 from the vehicle upper side.

As a result, in the present exemplary embodiment, even in cases in which the rear header reinforcement 20 is configured of metal or the like, transmission and reception of radio waves by the antenna unit 22 can be performed by transmitting radio waves through the roof panel 64. In addition, these components can be continued on the upper face of the roof portion 16 without producing a boundary line between a vehicle upper side portion of the antenna unit 22 and other portions.

Accordingly, in the present exemplary embodiment, the design properties of the appearance of the vehicle 10 can be secured while preventing the antenna unit 22 installed in the vehicle body 12 from being unduly affected by a load input to the vehicle body 12 during rollover or the like.

In the present exemplary embodiment, the roof portion 16 is provided with a closed cross section structure portion 36 and a closed cross section structure portion 40 that each extend in the vehicle width direction, and that are each shaped in a closed cross section shape when viewed in the vehicle width direction. The closed cross section structure portion 36 is disposed at the vehicle front side of the closed cross section structure portion 40 at a predetermined spacing from the closed cross section structure portion 40.

Further, the antenna unit 22 is supported from the vehicle lower side by a support plate 46, and the vehicle rear side of the support plate 46 is supported by the closed cross section structure portion 40, and the vehicle front side of the support plate 46 is supported by the closed cross section structure portion 36. As a result, in the present exemplary embodiment, a high rigidity portion can be disposed at the vehicle front side and at the vehicle rear side of the antenna unit 22 as viewed in the vehicle vertical direction.

This enables the reliability with which the antenna unit 22 is protected from a load due to rollover or the like to be increased in the present exemplary embodiment.

In the present exemplary embodiment, the support plate 46 can be removed from inside the vehicle interior 10A. As a result, when performing maintenance work and the like for the antenna unit 22, the antenna unit 22 can be removed from the vehicle body 12 side by an operation only from inside the vehicle interior 10A, without detaching the roof panel 64 or the like.

Thus, in the present exemplary embodiment, maintenance work or the like for the antenna unit 22 can be simplified.

In the present exemplary embodiment, the roof panel 64 is made of a transparent material, and light can be collected from the roof panel 64 side at the inside of the vehicle interior 10A.

When the roof panel 64 is made transparent, since antenna unit 22 and its peripheral portion can be seen from the outside of the vehicle 10, this is not preferable from the perspective of the design properties of the vicinity of the antenna unit 22 in the roof portion 16 of the vehicle 10.

Here, in the present exemplary embodiment, the coating film portion 68 is provided at a portion of the roof panel 64 that overlaps with the antenna unit 22 and the support plate 46 as viewed from the vehicle upper side, and the antenna unit 22 and the support plate 46 are hidden by the coating film portion 68.

Thus, in the present exemplary embodiment, it is possible to suppress impairment of the design properties of the appearance of the vehicle 10, while providing a sensation of openness inside the vehicle interior 10A.

Second Exemplary Embodiment

Figure 4:
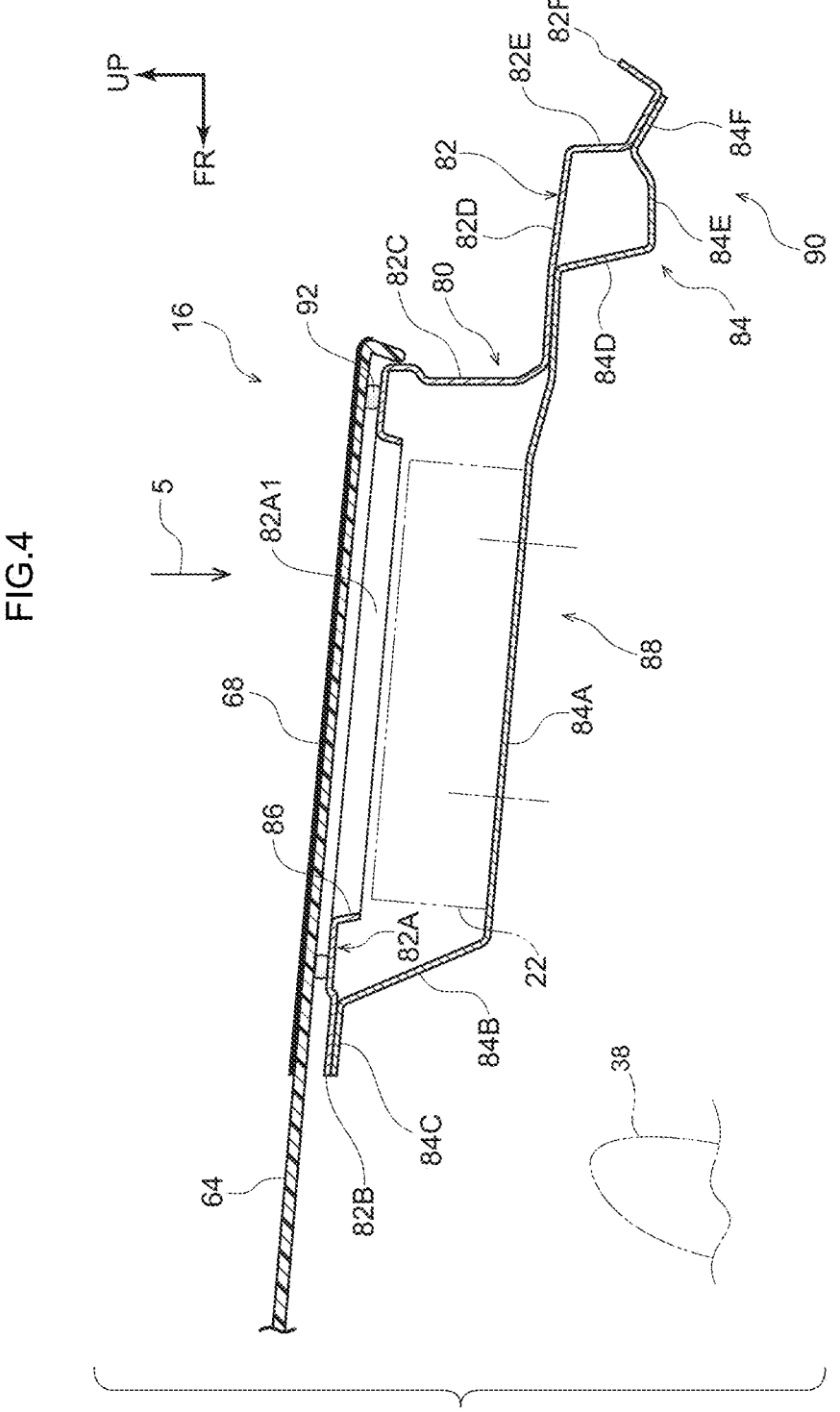
FIG. 4 is a cross sectional view schematically illustrating a configuration of a relevant portion of a vehicle body to which a vehicle roof structure according to a second exemplary embodiment is applied.
Figure 5:
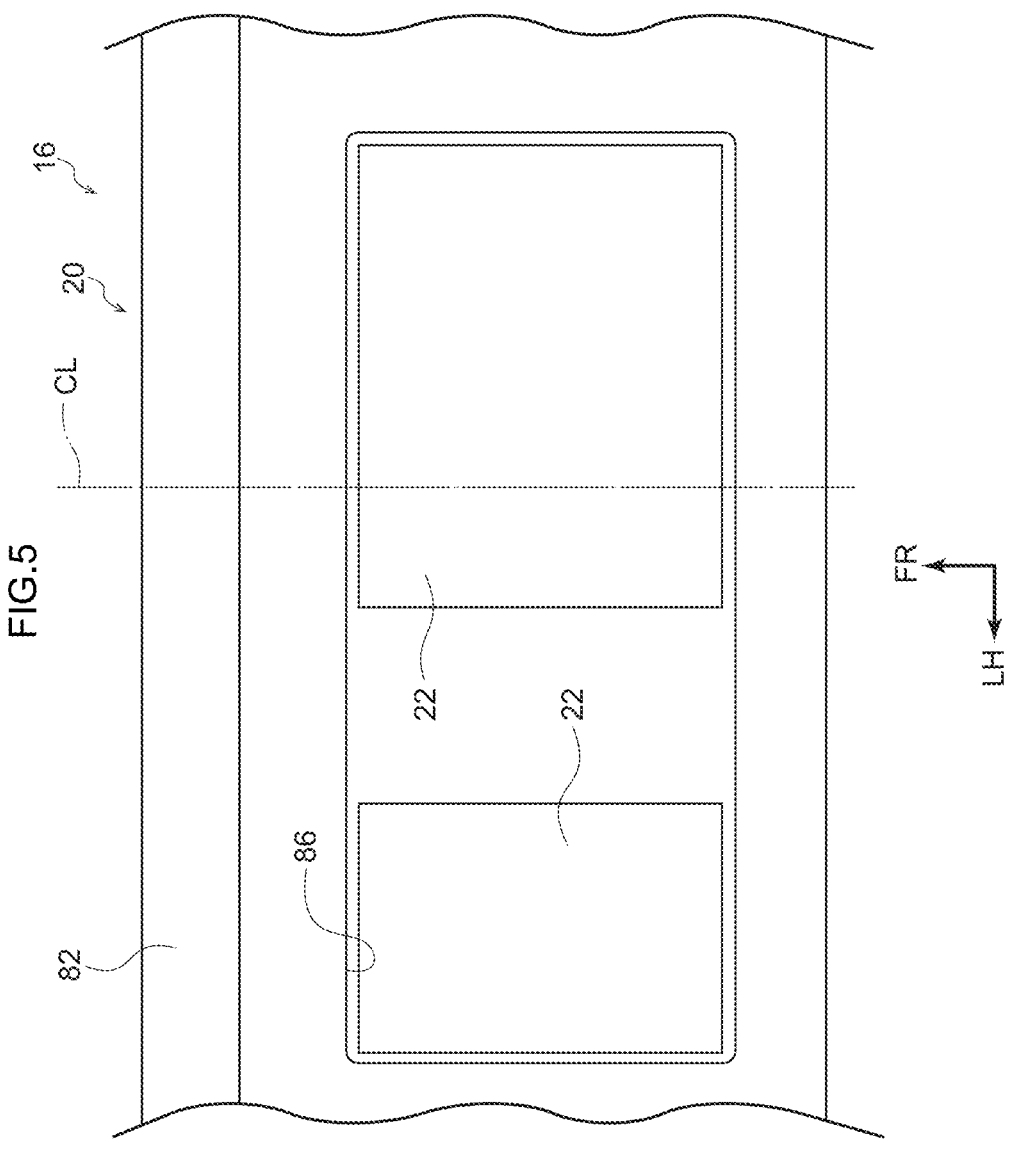
FIG. 5 is a plan view (a view in the direction of arrow 5 in FIG. 4) schematically illustrating a configuration of a relevant portion of a vehicle body to which a vehicle roof structure according to a second exemplary embodiment is applied.

Explanation follows regarding a second exemplary embodiment of a vehicle roof structure according to the present disclosure, with reference to FIGS. 4 and 5. Note that configuration portions that are the same as those in the first exemplary embodiment described above are appended with the same reference numerals, and explanation thereof is omitted.

Although the present exemplary embodiment has basically the same configuration as in the first exemplary embodiment described above, the present exemplary embodiment is different from the first exemplary embodiment described above in that the antenna unit 22 is disposed inside a "rear header reinforcement 80" serving as a reinforcing portion.

More specifically, the rear header reinforcement 80 is configured including an upper panel 82 configuring a vehicle upper side portion thereof, and a lower panel 84 configuring a vehicle lower side portion thereof, and these are formed by pressing a steel plate.

The upper panel 82 is configured including a first upper wall portion 82A, a first upper extending wall portion 82B, a first upper vertical wall portion 82C, a second upper wall portion 82D, a second upper vertical wall portion 82E, and a second upper extending wall portion 82F.

The first upper wall portion 82A configures a main portion of the upper panel 82, and extends in the vehicle width direction and the vehicle front-rear direction with its plate thickness direction in the vehicle vertical direction. One or more penetration portions 86 are provided in the first upper wall portion 82A.

The antenna unit 22 is housed inside the penetration portion 86 as viewed in the vehicle vertical direction. Namely, the size of the penetration portion 86 is such that the antenna unit 22 can pass through the penetration portion 86.

Further, a tube portion 82A1 that is extended toward a vehicle lower side from the penetration portion 86 by being subjected to burring, is integrally provided at a peripheral edge portion of the penetration portion 86.

The first upper extending wall portion 82B is extended from a peripheral edge portion at the vehicle front side of the first upper wall portion 82A toward the vehicle front side, with its plate thickness direction in the vehicle vertical direction.

The first upper vertical wall portion 82C extends from a peripheral edge portion at the vehicle rear side of the first upper wall portion 82A toward the vehicle lower side, with its plate thickness direction in the vehicle front-rear direction, and the second upper wall portion 82D extends from a peripheral edge portion at a vehicle lower side of the first upper vertical wall portion 82C toward the vehicle rear side, with its plate thickness direction in the vehicle vertical direction.

The second upper vertical wall portion 82E extends from a peripheral edge portion at the vehicle rear side of the second upper wall portion 82D toward the vehicle lower side, with its plate thickness direction in the vehicle front-rear direction, and the second upper extending wall portion 82F extends toward the vehicle rear lower side from a peripheral edge portion at the vehicle lower side of the second upper vertical wall portion 82E. Note that a portion of the second upper extending wall portion 82F at the vehicle rear side extends toward the vehicle upper side, and a weather strip is attached to this portion.

The lower panel 84 is configured including a first lower wall portion 84A, a first lower vertical wall portion 84B, a first lower extending wall portion 84C, a second lower vertical wall portion 84D, a second lower wall portion 84E, and a second lower extending wall portion 84F.

The first lower wall portion 84A configures a main portion of the lower panel 84, and extends in the vehicle width direction and the vehicle front-rear direction with its plate thickness direction in the vehicle vertical direction. The first lower wall portion 84A is disposed such that a majority of the first lower wall portion 84A overlaps with the first upper wall portion 82A when viewed in the vehicle vertical direction. A vehicle rear side portion of the first lower wall portion 84A is joined to a vehicle front side portion of the second upper wall portion 82D by a joint portion by spot welding or the like. The antenna unit 22 is disposed at the vehicle upper side of the first lower wall portion 84A, and the antenna unit 22 is attached to the first lower wall portion 84A by an attachment member.

The first lower vertical wall portion 84B extends toward the vehicle front upper side from a peripheral edge portion at the vehicle front side of the first lower wall portion 84A, and the first lower extending wall portion 84C extends toward the vehicle front side from a peripheral edge portion at the vehicle upper side of the first lower vertical wall portion 84B, with its plate thickness direction in the vehicle vertical direction. The first lower extending wall portion 84C is joined to the first upper extending wall portion 82B by a joint portion by spot welding or the like.

The second lower vertical wall portion 84D extends from a peripheral edge portion at the vehicle rear side of the first lower wall portion 84A toward the vehicle lower side, with its plate thickness direction in the vehicle front-rear direction, and the second lower wall portion 84E extends from a peripheral edge portion at a vehicle lower side of the second lower vertical wall portion 84D toward the vehicle rear side, with its plate thickness direction in the vehicle vertical direction.

The second lower extending wall portion 84F extends toward the vehicle rear lower side from a peripheral edge portion at the vehicle rear side of the second lower wall portion 84E, and the second lower extending wall portion 84F is joined to a vehicle front side portion of the second upper extending wall portion 82F by a joint portion by spot welding or the like.

The rear header reinforcement 80 configured as described above has a "front side closed cross section structure portion 88" as a closed cross section structure portion configured by the first upper wall portion 82A, the first upper vertical wall portion 82C, the first lower wall portion 84A, and the first lower vertical wall portion 84B provided at the vehicle front side thereof. The rear header reinforcement 80 has a "rear closed cross section structure portion 90" as a closed cross section structure portion configured by the second upper wall portion 82D, the second upper vertical wall portion 82E, the second lower vertical wall portion 84D, and the second lower wall portion 84E provided at the vehicle rear side thereof.

The front closed cross section structure portion 88 extends in the vehicle width direction, and has a closed cross section shape when viewed in the vehicle width direction, and a vehicle rear side portion of the roof portion 16 is reinforced by the front closed cross section structure portion 88. As described above, the antenna unit 22 is disposed inside the front closed cross section structure portion 88. Note that the rear seat 38 is disposed at a vehicle lower front side of the front closed cross section structure portion 88.

Further, the rear closed cross section structure portion 90 is a closed cross section shape that extends in the vehicle width direction, and that has a shape as viewed in the vehicle width direction that is smaller than a cross section of the front closed cross section structure portion 88. The upper edge portion 26A of the back door opening portion 26 is reinforced by the rear closed cross section structure portion 90.

Further, the roof panel 64 is disposed at the vehicle upper side of the front closed cross section structure portion 88, and the roof panel 64 is joined to the upper panel 82 by a joint portion 92 made of an adhesive or the like, provided so as to surround the penetration portion 86 as viewed in the vehicle vertical direction. Further, in the present exemplary embodiment, when the roof panel 64 is viewed from the vehicle upper side, the rear header reinforcement 80 and the antenna unit 22 are in a hidden state at the coating film portion 68.

According to such configuration, the shape of the rear header reinforcement 80, configuring a portion of the roof portion 16 of the vehicle body 12, as viewed in the vehicle width direction is a closed cross section shape, and the antenna unit 22 is disposed inside the rear header reinforcement 80.

As a result, in the present exemplary embodiment, the antenna unit 22 can be incorporated in the roof portion 16. Further, in the present exemplary embodiment, the penetration portion 86 is formed at the vehicle upper side portion of the rear header reinforcement 80, and at least one of radio waves from the antenna unit 22 and radio waves to the antenna unit 22 pass through the penetration portion 86. Thus, in the present exemplary embodiment, a space in which the antenna unit 22 can be installed in the roof portion 16 can be secured.

Derivative Example of First Exemplary Embodiment

Figure 6:
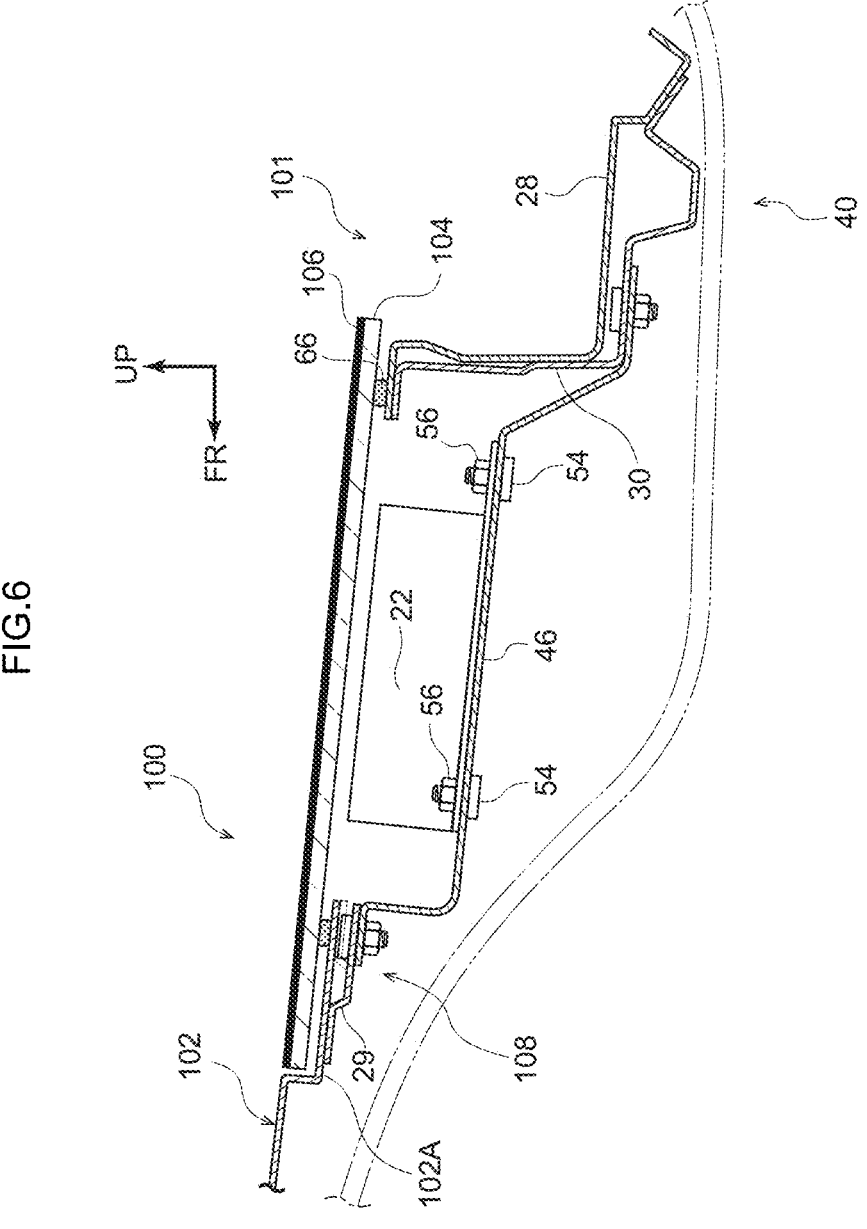
FIG. 6 is a cross sectional view schematically illustrating a configuration of a relevant portion of a vehicle body to which a vehicle roof structure according to a derivative example of a first exemplary embodiment is applied.

Explanation follows regarding a vehicle roof structure according to a derivative example derived from the first exemplary embodiment of the present disclosure, with reference to FIG. 6. Note that configuration portions that are the same as those in the first exemplary embodiment described above are appended with the same reference numerals, and explanation thereof is omitted.

The present exemplary embodiment has basically the same configuration as the first exemplary embodiment described above. Namely, the present derivative example is configured including a closed cross section structure portion 40 that extends in the vehicle width direction and has a shape that is a closed cross section shape when viewed in the vehicle width direction, and a "closed cross section structure portion 108" that extends in the vehicle width direction, has a shape that is a closed cross section shape when viewed in the vehicle width direction, and is disposed at a predetermined spacing from the closed cross section structure portion 40 at the vehicle front side of the closed cross section structure portion 40, the vehicle rear side of the antenna unit 22 being supported by the closed cross section structure portion 40, and the vehicle front side of the antenna unit 22 being supported from the vehicle lower side by a support plate 46 that is supported by the closed cross section structure portion 108.

However, in the present derivative example, a main portion of the upper face of a roof portion 100 of the vehicle body 12 is configured with a roof panel 102 made of steel, and a rear header reinforcement 101 is configured including a portion of a roof panel 102. Further, a portion at a vehicle upper side of the antenna unit 22 at the upper face of the roof portion 100 is configured with a resin panel 104.

Specifically, the resin panel 104 is configured by a resin such as polycarbonate that is capable of transmitting radio waves, and is formed in a plate shape that covers the rear header reinforcement 20 when viewed from the vehicle vertical direction. The resin panel 104 is joined to the upper panel 28 by a joint portion 66. Note that the upper face of the resin panel 104 is decorated with a decoration portion 106 made of urethane paint, a sticker, or the like, and configures a portion of the design face at the vehicle upper side of the roof portion 100.

The roof panel 102 is formed by pressing a steel plate, and is disposed at the vehicle front side of the resin panel 104. Further, the front lower panel 29 is disposed at the vehicle lower side of the end portion 102A at the vehicle rear side of the roof panel 102, and the end portion 102A and the front lower panel 29 are joined together at a joint portion by spot welding or the like, such that a closed cross section structure portion 108 is configured that extends in the vehicle width direction and has a closed cross section shape when viewed in the vehicle width direction. Note that a seal member is attached to a boundary portion between the roof panel 102 and the resin panel 104.

In the present exemplary embodiment configured in this manner, the configuration is basically the same as in the first exemplary embodiment described above. A mechanism and advantageous effects similar to those in the first exemplary embodiment are achieved, except for the mechanism and advantageous effects due to the fact that the entire roof panel is configured by a transparent material.

Further, in the present exemplary embodiment, a main portion of the upper face of the roof portion 100 is configured with the roof panel 102 made of steel, enabling the rigidity of the roof portion 100 to be secured.

Supplementary Explanation of Foregoing Exemplary Embodiments (1) In the exemplary embodiments described above, the rear header reinforcement is configured of a steel material; however, these materials may be configured of a carbon fiber reinforced resin, depending on the specifications or the like of the vehicle 10.

(2) In the first and the second exemplary embodiments described above, the roof panel 64 is configured of a transparent material; however, the roof panel 64 may be configured of an opaque material, depending on the specifications or the like of the vehicle 10. In cases in which such a configuration is employed, a coating portion made of urethane paint or the like may be provided over the entire upper surface of the roof panel 64.

An object of the present disclosure is to obtain a vehicle roof structure that is capable of securing the design properties of a vehicle's appearance, while preventing a communication device installed in a vehicle body from being affected by a load input to the vehicle body during rollover or the like.

A first aspect of the present disclosure is a vehicle roof structure, that includes: a rear header reinforcement that configures a part of a roof of a vehicle body, that is provided with a closed cross section extending in a vehicle width direction and having a closed cross sectional shape as viewed in the vehicle width direction, and that is configured to support an antenna, configured for at least one of transmission or reception of radio waves, directly or via a member in a state in which a vehicle upper side above the antenna is opened; and a roof panel that configures a main part of an upper surface of the roof, that covers the antenna from the vehicle upper side, and that is configured by a radio wave-transmissible material.

According to a vehicle roof structure according to a first aspect, a part of a roof portion (roof) of a vehicle body is configured by a reinforcing portion (rear header reinforcement), and the reinforcing portion includes a closed cross section structure portion (closed cross section) that extends in the vehicle width direction and has a shape that is a closed cross sectional shape when viewed in the vehicle width direction. As a result, in the present aspect, the reinforcing portion can reinforce the roof portion of the vehicle body with respect to a load caused by rollover or the like. The reinforcing portion supports a communication device (antenna), which is capable of at least one of transmitting and receiving radio waves, directly or via a member.

Incidentally, from the perspective of reinforcing the roof portion, it is preferable to configure the constituent elements of the roof portion, such as the reinforcing portion, of metal or the like; however, metal cannot transmit radio waves transmitted and received by the communication device. In this regard, it would be conceivable to configure only the vehicle upper side portion of the roof panel above the communication device from a material that is capable of transmitting radio waves, such as a resin, and to configure the other portions of the roof panel from a steel material or the like. However, in such a configuration, it is conceivable that a boundary line would be produced between a vehicle upper side portion of the communication device in the roof panel and other portions, and the appearance of the vehicle would be impaired.

Here, in the present aspect, the reinforcing portion supports the communication device in a state in which a vehicle upper side above the communication device is open. A roof panel configuring a main portion of the upper face of the roof portion is configured by a material capable of transmitting radio waves, and covers the communication device from the vehicle upper side.

As a result, in the present aspect, even when the reinforcing portion is configured of metal or the like, radio waves can be transmitted and received by the communication device by transmitting the radio waves through the roof panel. It is also possible to configure these portions continuously on the upper face of the roof portion, without creating a boundary line between a vehicle upper side portion of the communication device and other portions.

A second aspect of the present disclosure is the vehicle roof structure of the first aspect, wherein the rear header reinforcement includes: a first closed cross section extending in the vehicle width direction and having a closed cross sectional shape as viewed in the vehicle width direction; and a second closed cross section extending in the vehicle width direction, having a closed cross sectional shape as viewed in the vehicle width direction, and disposed at a vehicle front side of the first closed cross section at a predetermined spacing from the first closed cross section, and wherein the antenna is supported from a vehicle lower side by a support plate that is supported at a vehicle rear side by the first closed cross section and that is supported at a vehicle front side by the second closed cross section.

According to a vehicle roof structure according to a second aspect, a first reinforcing portion (first closed cross section) and a second reinforcing portion (second closed cross section), each extending in the vehicle width direction and having a closed cross section shape when viewed in the vehicle width direction, are provided at a roof portion of a vehicle body. Further, the second reinforcing portion is disposed at a vehicle front side of the first reinforcing portion at a predetermined spacing from the first reinforcing portion.

Further, the communication device is supported from the vehicle lower side by a communication device support portion (support plate), with a vehicle rear side of the communication device support portion supported by the first reinforcing portion, and a vehicle front side of the communication device support portion supported by the second reinforcing portion. This enables a high rigidity portion to be disposed at the vehicle front side and the vehicle rear side of the communication device as viewed in the vehicle vertical direction.

A third aspect of the present disclosure is the vehicle roof structure of the second aspect, wherein the support plate is configured attachably to the first closed cross section and the second closed cross section from a vehicle lower side.

According to a vehicle roof structure according to a third aspect, the communication device support portion can be removed from the side of the vehicle interior. As a result, in cases in which maintenance work or the like is performed on a communication device, the communication device can be removed from the vehicle body side by an operation only from the vehicle interior side, without removal or the like of the roof panel.

A fourth aspect of the present disclosure is the vehicle roof structure of any of the first to third aspects, wherein: the roof panel is configured by a transparent material, and a coating film configured to hide the antenna is provided at a portion of the roof panel that overlaps with the antenna as viewed from a vehicle upper side.

According to a vehicle roof structure according to a fourth aspect, the roof panel is made of a transparent material, and light can be gathered from the side of the roof panel inside the vehicle interior.

Incidentally, making the roof panel transparent enables the communication device and its peripheral portions to be seen from the outside of the vehicle, which is not preferable from the perspective of the design properties in the vicinity of the communication device in the roof portion of the vehicle.

Here, in the present aspect, a decoration portion (coating film) is provided at a portion of the roof panel that overlaps with the communication device and the communication device support portion as viewed from the vehicle upper side, and the communication device and the communication device support portion are hidden by the decorative portion.

The fifth aspect of the present disclosure is the vehicle roof structure of the first aspect, wherein: the rear header reinforcement is configured in a closed cross sectional shape as viewed in the vehicle width direction, the antenna is disposed inside the rear header reinforcement, and a tunnel is formed at a portion at a vehicle upper side of the rear header reinforcement.

According to a vehicle roof structure according to a fifth aspect, the shape of a reinforcing portion configuring a portion of a roof portion of a vehicle body, as viewed in a vehicle width direction, is a closed cross sectional shape, and a communication device is disposed inside the reinforcing portion. As a result, in the present aspect, the communication device can be incorporated in the roof portion of the vehicle body. Further, in the present aspect, a penetration portion (tunnel) is formed in a vehicle upper side portion of the reinforcing portion, and at least one of radio waves from the communication device and radio waves to the communication device pass through the penetration portion.

As explained above, the vehicle roof structure according to the first aspect enables the design properties of the vehicle appearance to be secured, while preventing a communication device installed in the vehicle body from being affected by a load input to the vehicle body during rollover or the like.

The vehicle roof structure according to the second aspect enables the reliability with which a communication device is protected from a load due to rollover or the like to be increased.

The vehicle roof structure according to the third aspect can simplify maintenance work or the like for a communication device.

The vehicle roof structure according to the fourth aspect can secure a space in which a communication device can be installed in a roof portion of a vehicle body.

The vehicle roof structure according to the fifth aspect enables the design properties of the vehicle appearance to be kept from being impaired while providing a sensation of openness inside the vehicle interior.

14

What is claimed is:

1. A vehicle roof structure, comprising:
a rear header reinforcement that configures a part of a roof of a vehicle body, that is provided with a closed cross section extending in a vehicle width direction and having a closed cross sectional shape as viewed in the vehicle width direction, and that is configured to support an antenna, configured for at least one of transmission or reception of radio waves, directly or via a member in a state in which a vehicle upper side above the antenna is opened; and
a roof panel that configures a main part of an upper surface of the roof, that covers the antenna from the vehicle upper side, and that is configured by a radio wave-transmissible material, wherein
the rear header reinforcement extends along an upper edge portion of a backdoor opening portion in the vehicle width direction,
the rear header reinforcement includes:
an upper panel configuring an upper vehicle side portion of the rear header reinforcement,
a front lower panel configuring a vehicle front side portion of a vehicle lower side portion of the rear header reinforcement, and
a rear lower panel configuring a vehicle rear side portion of a vehicle lower side of the rear header reinforcement,
the upper panel includes a first upper wall portion and a first upper vertical wall portion,
the first upper wall portion extends in the vehicle width direction and a vehicle front-rear direction, with a plate thickness direction of the first upper wall portion in a vehicle vertical direction,
the first upper vertical wall portion extends from a peripheral edge portion at a vehicle rear side of the first upper wall portion toward the vehicle lower side, with a plate thickness direction of the first upper vertical wall portion in the vehicle front-rear direction,
one end of the roof panel is positioned at an upper end portion of the first upper vertical wall portion, and
the antenna is fastened to a support plate extending from the rear lower panel and configuring a lower portion of the closed cross section.

2. The vehicle roof structure of claim 1, wherein the rear header reinforcement comprises:
a first closed cross section extending in the vehicle width direction and having a closed cross sectional shape as viewed in the vehicle width direction; and
a second closed cross section extending in the vehicle width direction, having a closed cross sectional shape as viewed in the vehicle width direction, and disposed at a vehicle front side of the first closed cross section and at a predetermined spacing from the first closed cross section, and
wherein the antenna is supported from the vehicle lower side by the support plate that is supported at the vehicle rear side by the first closed cross section and that is supported at the vehicle front side by the second closed cross section.

3. The vehicle roof structure of claim 2, wherein the support plate is configured attachably to the first closed cross section and the second closed cross section from the vehicle lower side.

4. The vehicle roof structure of claim 1, wherein:
the roof panel is configured by a transparent material, and
a coating film configured to hide the antenna is provided at a portion of the roof panel that overlaps with the antenna as viewed from the vehicle upper side.

5. The vehicle roof structure of claim 1, wherein:

the rear header reinforcement is configured in a closed cross sectional shape as viewed in the vehicle width direction, the antenna is disposed inside the rear header reinforcement, and a tunnel is formed at a portion at the vehicle upper side of the rear header reinforcement.

6. The vehicle roof structure of claim 1, wherein a portion of the roof panel that covers the antenna from the vehicle upper side is configured by resin.

7. The vehicle roof structure of claim 1, wherein the rear header reinforcement is configured of a steel material.

8. The vehicle roof structure of claim 1, wherein the rear header reinforcement is configured of a carbon fiber reinforced resin.

9. The vehicle roof structure of claim 1, wherein the roof panel is configured of an opaque material.

10. The vehicle roof structure of claim 9, wherein a coating portion of urethane paint is provided over an entire upper surface of the roof panel.

* * * * *